United States Patent
Ennelin et al.

(10) Patent No.: US 6,773,512 B2
(45) Date of Patent: Aug. 10, 2004

(54) METHOD FOR THE RECOVERY OF SUGARS

(75) Inventors: Anu Ennelin, Espoo (FI); Juho Jumppanen, Royal Earlwood (GB); Vili Ravanko, Clinton, IA (US); Juha Nurmi, Kirkkonummi (FI); Miikka Kaira, Helsinki (FI); Heikki Heikkilä, Espoo (FI)

(73) Assignee: Danisco Sweeteners Oy, Espoo (FI)

( * ) Notice: Subject to any disclaimer, the term of this patent is extended or adjusted under 35 U.S.C. 154(b) by 15 days.

(21) Appl. No.: 10/334,428

(22) Filed: Dec. 30, 2002

(65) Prior Publication Data

US 2003/0222021 A1 Dec. 4, 2003

Related U.S. Application Data

(60) Provisional application No. 60/345,739, filed on Dec. 31, 2001.

(51) Int. Cl.$^7$ ............................... C13D 3/14; C07H 1/08
(52) U.S. Cl. ........................ 127/46.2; 127/40; 536/127; 536/128
(58) Field of Search ................... 127/40, 46.2; 536/127, 536/128

(56) References Cited

U.S. PATENT DOCUMENTS

| | | | |
|---|---|---|---|
| 3,044,905 A | * | 7/1962 | Lefevre .................... 127/46.3 |
| 3,677,818 A | | 7/1972 | Casebier et al. |
| 4,471,114 A | | 9/1984 | Sherman et al. |
| 4,631,129 A | | 12/1986 | Heikkila |
| 4,837,315 A | | 6/1989 | Kulprathipanja |
| RE33,105 E | * | 10/1989 | Sherman et al. ............ 536/127 |

FOREIGN PATENT DOCUMENTS

| | | |
|---|---|---|
| EP | 0 104 911 | 4/1984 |
| FI | 78734 | 5/1989 |
| GB | 1 540 556 | 2/1979 |
| WO | WO 96/27029 | 9/1996 |
| WO | WO 00/42225 | 7/2000 |

OTHER PUBLICATIONS

Jones J.K.N. et al., "The Separation of Sugars On Ion–Exchange Resins", *Canadian Journal of Organic Chemistry* 38:2290–2294 (1960), no month provided.

Reitzschel G.M. et al., "Characterization Of Biotechnological Processes and Products Using High–Performance Liquid Chromatography (H P L C) VII. Determination Of Organic Compounds In Sulphite Liquor", *Acta Biotechnol.* 11(5):511–519 (1991), no month provided.

* cited by examiner

*Primary Examiner*—David Brunsman
(74) *Attorney, Agent, or Firm*—Scully, Scott, Murphy & Presser

(57) ABSTRACT

The invention relates to a chromatographic separation process of recovering mannose with high purity. The invention is based on the use of a chromatographic separation resin including a resin which is at least partly in a $Ba^{2+}$ form resin and a resin which is in other than $Ba^{2+}$ form.

36 Claims, 7 Drawing Sheets

METHOD FOR THE RECOVERY OF SUGARS

CROSS REFERENCE TO RELATED APPLICATION

This application claims priority from U.S. Provisional Appln. No. 60/345,739, filed Dec. 31, 2001.

BACKGROUND OF THE INVENTION

The present invention relates to a chromatographic separation method of separating carbohydrates, especially sugars, from a mixture including the same. The mixture to be treated in accordance with the present invention is typically a biomass-derived solution including carbohydrates/sugars. Especially, the invention provides a chromatographic separation method of recovering mannose with high purity from biomass-derived solutions, such as spent sulphite pulping liquors. Mannose can be recovered in a crystalline form or in the form of a solution. The claimed process of recovering mannose is based on the use of a combination of a $Ba^{2+}$ form resin and a resin in other than $Ba^{2+}$ form as the separation resin, whereafter mannose is crystallized, if desired. In connection with the separation process of the invention, xylose and arabinose products can also be obtained as by-products, depending on the composition of the starting biomass-derived solution.

Mannose is useful e.g. for various pharmaceutical applications. It can be used as a starting material or raw material for various pharmaceutical products. Mannose is also therapeutically useful in the treatment of urine infections and intravenous inflammation conditions. In food technology, mannose is useful e.g. for so-called Positech applications (GMO-testing of food products).

Mannose is also useful as the raw material for the production of mannitol, which has various pharmaceutical applications.

Mannose can be recovered from wood resources, where mannose is present as a mixture with other carbohydrates and lignin components. In wood and other plant-based material, mannose typically occurs in polymeric form, such as hemicellulose, most frequently as a heteropolymer with glucose and/or galactose in glucomannans, galactoglucomannans and galactomannans. Spent liquors obtained from conifer wood-pulping processes are especially rich in mannose. Mannose has also been recovered from vegetable ivory nuts and specific seaweeds.

The recovery of mannose with high purity from plant-based material has presented a problem in the state of the art.

Jones, J. K. N & Wall, R. A. (Canadian Journal of Organic Chemistry 38 (1960), pp. 2290 to 2294) have described a process for the separation of sugars from synthetic sugar mixtures and plant extracts using ion-exchange resins. The process relates to the separation of monosaccharide mixtures, including D-mannose and D-mannitol, using neutral salt forms of sulphonic acid type ion-exchange resins. The resin Dowex 50W X8 in $Ba^{2+}$ form has been used as the separation resin.

Larsson, L. I & Samuelsson, O. (Acta Chemica Scandinavica 19 (1965), pp. 1357 to 1364) describe an automatic procedure for the separation of monosaccharides present in wood hydrolysates using ion exchange resins. The separation of 16 monosaccharides, including D-mannose, has been studied by partition chromatography on strongly basic anion exchange resins in the sulphate form using ethanol as the eluant.

Furthermore, the utilization of ion exchangers for the isolation of monosaccharides has been studied with the aim to examine the behaviour of sugars on columns containing a bisulfite saturated resin. For example, an anion exchanger (Amberlite IRA-400) in the bisulphite form has been used to separate fructose, glucose and mannose. As a practical result of this study, an improved method for the determination of reducing sugars in sulphite waste liquor is proposed.

The interactions occurring between aluminium oxide and aqueous solutions of monosaccharides, including D-mannose have also been studied. It is suggested that by proper choice of alumina, separation of sugars can be easily and quickly achieved on a preparative as well as analytical scale.

It is also known to recover mannose from various sources through mannose derivatives. Fujita, T & Sato, T in Bull. Chem. Soc. Japan 33 (1960) 353 disclose the recovery of D-mannose through N-phenyl-D-mannopyranosylamine. It is recited that N-phenyl-D-mannopyranosylamine is so stable and insoluble in water that it was recommended for the isolation of D-mannose even from very impure raw materials.

Herrick, F. W., Casebier, R. L., Hamilton, J. K. & Wilson, J. D. ("Mannose chemicals", Applied Polymer Symposium No. 28 (1975), pp. 93 to 108) disclose a study relating to the development of an economic process for recovering mannose or its derivatives from wood resources, such as a spent sulphite liquor, where mannose is a major component of mixtures containing other carbohydrates and lignin fragments. The main achievement of this work was the development of processes for recovering sodium mannose bisulphite and methyl mannoside from several raw materials. Processes were developed for recovering mannose from crude mixtures via two routes: (1) formation of the sodium bisulphite adducts of monomeric wood sugar mixtures, crystallization and separation of sodium mannose bisulphite and regeneration of mannose from this intermediate, and (2) anhydrous methanolysis concurrent with glycosidation of crude mixed-sugar polymers or monomers, crystallization and separation of methyl α-D mannoside and regeneration of mannose from this intermediate. These procedures for recovering mannose have the drawback that they are very cumbersome to carry out in practice.

Sinner, M, Simatupang, M. H. & Dietrichs, H. H. ("Automated Quantitative Analysis of Wood Carbohydrates by Borate Complex Ion Exchange Cromatography", Wood Science and Technology, 1975, pp. 307 to 322) describe a simple automated analytical method for the separation and quantitative determination of sugars from acidic and enzymatic hydrolysates of wood polysaccharides via borate complex ion exchange chromatography. The sugars separated in this way include mannose, fructose, arabinose, galactose, xylose, glucose and disaccharides like xylobiose, cellobiose and sucrose.

GB 1 540 556 (ICI Americas, publ. Feb. 14, 1979) relates to a method of separating mannose from glucose present in aqueous solutions. The starting mixture of glucose and mannose is typically obtained by epimerization of glucose in an aqueous solution. The separation of mannose from glucose is typically carried out using a cation exchange resin in the form of an alkaline earth metal salt, such as in $Ca^{2+}$, $Sr^{2+}$ or $Ba^{2+}$ form. The cation exchange resin is preferably a strongly acid cation exchange resin, typically a resin based on styrene divinylbenzene.

The separation of sugars from lignosulphonates has been described by Hassi, R., Tikka, P. & Sjöstrom, E. ("Recovery of Lignosulphonates and Sugars from Spent Sulphite Liquors by Ion Exclusion Chromatography, 1982 International Sulfite Pulping Conference, Sheraton Centre Hotel, Toronto, Ontario, October 20–22, pp. 165 to 170). Ion exclusion chromatography on a strongly acid cation exchange resin has been applied to the fractionation of lignosulphonates and sugars, including mannose, present in a spent sulphite liquor. The resin used in the tests was a strongly acid gel-type polystyrene cation exchange resin (Amberlite IR-120, $Ca^{2+}$ form). It is proposed that the sugar fraction might be used as a raw material source for mannitol production.

Finnish Patent 78734 (Suomen Sokeri Oy, publ. Apr. 5, 1987) relates to a multi-step process of separating sugars and lignosulphonates from a spent sulphite pulping liquor. This process comprises introducing a spent sulphite pulping liquor into a chromatographic column including a separation resin in a metal salt form, typically a strongly acid cation exchange resin in a $Ca^{2+}$ form, eluting the column with water to recover a fraction rich in lignosulphonates and a fraction rich in sugars, introducing the fraction rich in sugars thus obtained into another chromatographic column including a separation resin in a monovalent metal salt form, typically in $Na^+$ form. A sugar fraction free from lignosulphonates is obtained.

WO 96/27029 (Xyrofin Oy, publ. Sep. 6, 1996) relates to a method of recovering an organic compound, such as sugars, from solutions by crystallizing the compound substantially by way of nucleation. It is proposed that mannose can be recovered by the nucleation crystallization process, for example.

Finnish Patent 97 625 (Xyrofin Oy, publ. Mar. 5, 1996) discloses a process for crystallizing xylose. In this process, xylose is recovered by crystallization from solutions in which the xylose purity is relatively low. Especially, this process concerns recovering xylose from biomass-derived solutions.

WO 99/10542 (Cultor Corporation, publ. Mar. 4, 1999) discloses a process of recovering L-arabinose from sugar beet pulp by a chromatographic separation method using a cation exchanger in a monovalent metal form as the separation resin. The L-arabinose solution thus obtained is purified by means of cation and anion exchangers and adsorbent resins.

WO 01/21271 A1 (Sohkar Oy, publ. Mar. 29, 2001) discloses a method of recovering pectin, arabinose and salts from vegetable material using a cation exchange resin, which is preferably in the form of a multivalent metal.

Biomass-derived raw materials used for the recovery of mannose are typically complex multicomponent mixtures. Separation of mannose with sufficient purity from these complex mixtures has presented a problem. One of the problems associated with the above-described known processes is that they provide mannose as a mixture with other closely-related sugars or that they do not provide mannose with a sufficient degree of purity. On the other hand, the production of mannose from mannans and other mannose derivatives is technically very cumbersome. Furthermore, it has been problematical to prepare suitable starting mannose solutions for the crystallization of mannose to obtain a crystalline mannose product.

It has now been found that mannose with high purity can be effectively recovered from biomass-derived carbohydrate-containing solutions using a novel chromatographic separation method. With the chromatographic method of the invention, a mannose fraction having a purity of 45 to 80% or more can be obtained. The mannose fraction obtained from the chromatographic separation can then be further purified by crystallization. The crystallization provides a crystalline mannose product having a purity of up to 99% or more. In connection with the method of the invention, various other sugars, such as xylose and arabinose can be recovered as by-products, depending on the composition of the starting biomass-derived raw material.

BRIEF DESCRIPTION OF THE INVENTION

It is thus an object of the present invention to provide a method of recovering a mannose product with high purity from carbohydrate mixtures containing the same. As by-products, various other sugars, such as xylose and arabinose can be recovered. The objects of the invention are achieved by a method which is characterized by what is stated in the independent claims. The preferred embodiments of the invention are disclosed in the dependent claims.

The invention is based on the idea of purifying the mannose-containing carbohydrate mixture chromatographically using at least two separation resins, one of which is $Ba^{2+}$-based resin.

With the method of the invention, a mannose product with high purity can be obtained.

DEFINITIONS RELATING TO THE INVENTION

In the specification and throughout the examples and the claims, the following definitions have been used:

SAC refers to a strongly acid cation exchange resin.

DS refers to a dry substance content measured by Karl Fischer titration, expressed as % by weight.

RDS refers to a refractometric dry substance content, expressed as % by weight.

BRIEF DESCRIPTION OF THE DRAWINGS

The following drawings are illustrative embodiments of the invention and are not meant to limit the scope of the invention as defined in the claims in any way.

DETAILED DESCRIPTION OF THE INVENTION

Figure 1:
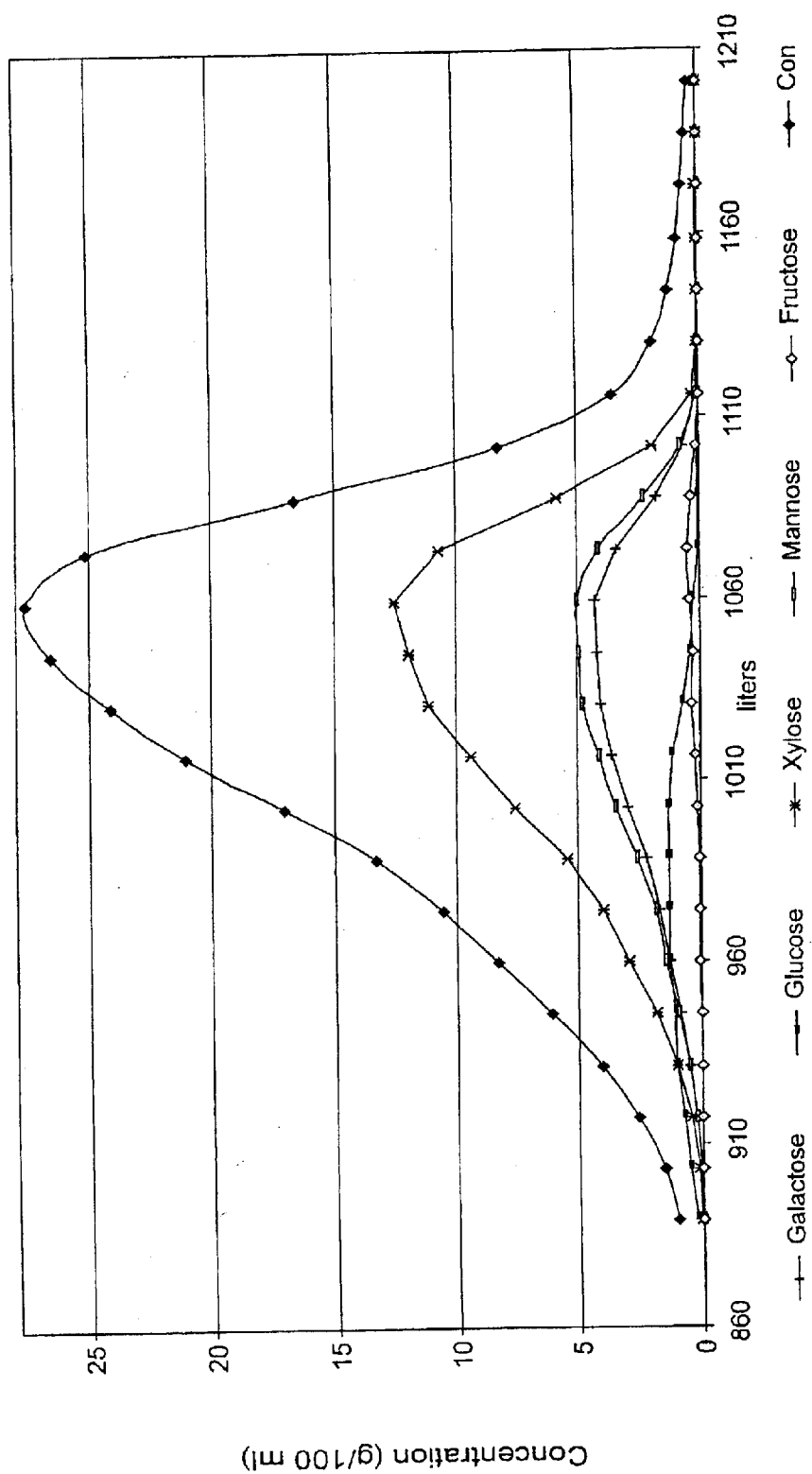
FIG. 1 is a graphical presentation of the concentration profile of the mannose-arabinose separation with $Na^+$ form SAC resin (separation A) of Example 1.

The invention relates to a method of recovering mannose from a solution containing the same. The method of the invention is characterized in that said mixture is subjected to a chromatographic separation process using at least one chromatographic separation resin bed which is at least partly in a $Ba^{2+}$ form and at least one chromatographic separation resin bed which is in other than $Ba^{2+}$ form and recovering at least one mannose fraction.

The chromatographic separation process of the invention typically comprises at least two chromatographic separation steps, whereby at least one of these steps is carried out with a chromatographic separation resin bed which is at least partly in a $Ba^{2+}$ form and at least one of these steps is carried out with a chromatographic separation resin bed which is in other than $Ba^{2+}$ form.

One embodiment of the invention is typically carried out by feeding a solution containing mannose into a first chromatographic column including a chromatographic separation resin bed which is at least partly in a $Ba^{2+}$ form, eluting said column with an eluant, recovering a first mannose fraction, and then feeding said first mannose fraction into a second chromatographic column including a chromatographic separation resin bed in other than $Ba^{2+}$ form, eluting said column with an eluant, and recovering a second mannose fraction.

In another embodiment of the invention, said chromatographic separation process comprises two separation steps with a chromatographic separation resin bed which is at least partly in a $Ba^{2+}$ form and one separation step with a chromatographic separation resin bed in other than $Ba^{2+}$ form.

This embodiment of the invention is typically carried out by feeding a solution containing mannose into a first chromatographic column including a chromatographic separation resin bed which is at least partly in a $Ba^{2+}$ form, eluting said column with an eluant, recovering a first mannose fraction, feeding said first mannose fraction into a second chromatographic column including a chromatographic separation resin bed which is at least partly in a $Ba^{2+}$ form, eluting said column with an eluant, recovering a second mannose fraction, and then feeding said second mannose fraction into a third chromatographic column including a chromatographic separation resin bed in other than $Ba^{2+}$ form, eluting said column with an eluant, and recovering a third mannose fraction.

In the above-mentioned embodiment of the invention, some other separation may be carried out before the $Ba^{2+}$ separation. In the same way, some other separation may be carried out between the $Ba^{2+}$ separations. Furthermore, between two ion exchange operations, equilibration of the ions or the ion composition is typically carried out, for example by ion exchange.

In one embodiment of the invention, said resin (resin bed) which is at least partly in a $Ba^{2+}$ form is substantially in a $Ba^{2+}$ form. During the chromatographic separation process, balancing of the chromatographic column occurs, whereby said resin bed which is at least partly in a $Ba^{2+}$ form may even contain other ions, such as $H^+$, alkali metal cations, such as $Na^+$ and $K^+$, and alkaline earth metal cations, such as $Ca^{2+}$ and $Mg^{2+}$.

Said resin which is at least partly in a $Ba^{2+}$ form refers to a cation exchange resin.

Said resin (resin bed) in other than $Ba^{2+}$ form refers to a resin, which is in the form of a cation other than $Ba^{2+}$. Said resin is typically a cation exchange resin, where the cation is in the hydrogen form ($H^+$), in $NH_4^+$ form or in the form of a metal selected from alkaline metals and alkaline earth metals, such as $Na^+$, $K^+$, $Mg^{2+}$ and $Ca^{2+}$. An especially preferred metal is $Ca^{2+}$.

The chromatographic separation for obtaining mannose in accordance with the present invention is typically carried out with a strongly acid cation exchange resin. A preferred resin is a cross-linked styrene-divinylbenzene based resin. A suitable cross-linking degree of the resin is 1 to 20% by weight, preferably 3 to 8% by weight. The average particle size of the resin is normally 10 to 2000 $\mu$m, preferably 100 to 400 $\mu$m. Zeolite-based molecular sieves can also be used.

The eluant used in the chromatographic separation according to the present invention is either water, a solvent, e.g. an alcohol, or a mixture thereof. A preferred eluant is water.

The elution is preferably carried out at a temperature from 10 to 95° C., more preferably from 30 to 95° C., most preferably from 55 to 85° C.

The chromatographic separation method of the invention provides a mannose fraction where mannose is in a solution form. The mannose product obtained from the chromatographic separation has a typical purity of 45 to 80% mannose on RDS.

To improve the yield of the chromatographic separation, recycle fractions of the chromatographic separation can also be used.

The chromatographic separation method of the invention may further comprise one of more purification steps selected from membrane filtration, ion exchange, evaporation, filtration and derivatization. These purification steps may be carried out before, after or between said chromatographic separation step/steps.

Ion exchange is typically carried out to purify the mannose-containing solution from $SO_4$—ions, for example.

In the derivatization method, a mannose derivative is formed, whereafter mannose is regenerated from the derivative thus obtained. One example of useful mannose derivatives is N-phenyl-D-mannopyranosylamine.

The mannose solution obtained from the chromatographic separation can be further purified by crystallization to obtain a crystalline mannose product. The crystallization is typically carried out using a solvent selected from water, alcohol and a mixture of water and alcohol. In a preferred embodiment of the invention, the crystallization is carried out with a mixture of ethanol and water.

The crystallization is carried out by evaporating the mannose solution or mannose syrup obtained from the chromatographic separation to an appropriate dry substance content (e.g. to RDS of about 85%). The boiling syrup may be seeded with mannose seed crystals. The seeds, if used, are suspended in a crystallization solvent, which may be either water, a solvent, e.g. an alcohol, or a mixture thereof. A typical crystallization solvent is ethanol. After cooling the crystallization mass to room temperature, the crystallization solvent is added. The crystallization mass may then be allowed to stand for a period of time, preferably for 3 to 6 days, typically at room temperature, whereafter the crystals are filtered off. The filtration cake is washed with the crystallization solvent. Mannose crystals with a high purity are obtained.

The crystallization provides crystalline mannose having a purity of over 90%, preferably over 95% and most preferably over 99% on RDS.

The method of the invention may also comprise separation of other sugars, such as xylose, rhamnose and arabinose, depending on the composition of the starting mannose-containing solution. The separation of other sugars is typically carried out before the separation of mannose.

The method of the invention may thus comprise separation of xylose as a pretreatment step. The recovery of xylose may be carried out by various methods, e.g. through precipitation crystallization.

The xylose precipitation crystallization is preferably carried out immediately before the chromatographic separation of mannose.

In the xylose precipitation crystallization, the solution containing mannose and some xylose is subjected to a crystallization step. The precipitation crystallization of xylose is typically carried out by evaporating the solution to a desired dry substance content, seeding the solution with xylose seed crystals, and then cooling the crystallization mass according to a desired cooling program. The crystallization mass is filtered to obtain a xylose cake and mannose-containing crystallization run-off. Xylose is recovered from the crystallization cake and the run-off containing mannose is subjected to the chromatographic purification described above for obtaining mannose with high purity in accordance with the present invention.

The method of the invention may also comprise separation of arabinose, preferably as a pretreatment step. The separation of arabinose may be carried out before the precipitation crystallization of xylose. Chromatographic separation is typically used for the recovery of arabinose. The chromatographic separation of arabinose is preferably carried out using a chromatographic separation resin bed in the form of a monovalent cation, which is selected from hydrogen, ammonium and alkali metal cations. Said monovalent cation is typically selected from $H^+$, $Na^+$, $K^+$ and $NH_4^+$. An arabinose fraction is recovered. The chromatographic separation resin is preferably a strongly acid cation exchange resin.

The arabinose fraction may be subjected to further chromatographic purification. The chromatographic purification of the arabinose fraction typically comprises at least one step using a chromatographic separation resin bed in the form of an alkaline earth metal, preferably $Ca^{2+}$. The arabinose fraction thus obtained may also be crystallized.

The method of the invention may also comprise separation of rhamnose as a pretreatment step. The separation of rhamnose is typically carried out before the separation of arabinose.

For xylose-rich raw materials, the method of the invention may also comprise separation of xylose as a pretreatment step. The separation of xylose it typically carried out before the separation of arabinose.

The method of the invention may also include further purification steps, such as membrane filtration, e.g. ultrafiltration and nanofiltration, ion exchange, evaporation and filtration to remove e.g. lignosulphonates, acids (organic acids and inorganic acids) and salts.

The starting solution containing mannose is typically a mixture containing carbohydrates, such as sugars. The solution may contain, in addition to mannose, e.g. xylose, galactose, glucose, rhamnose, arabinose and fructose. The mixture may also contain disaccharides and higher saccharides.

The material containing a mixture of carbohydrates is typically derived from a biomass, typically mannose-containing vegetable material, such as softwood or hardwood, straw, corn husks, corn cops, corn fibers and sugar beet. The starting material is as a rule used in the form of a hydrolysate obtained e.g. by prehydrolysis, total hydrolysis, steam hydrolysis, enzymatic hydrolysis or acid hydrolysis.

The biomass hydrolysate used for the recovery of mannose in accordance with the present invention is typically a spent liquor obtained from a pulping process. The spent liquor is especially a spent sulphite pulping liquor, which may be obtained by acid, basic or neutral sulphite pulping. If the biomass hydrolysate, e.g. the spent liquor contains mannose in polymeric form, the polymeric mannose can be hydrolysed by acids or enzymes before the chromatographic separation steps.

A typical spent liquor useful in the present invention is a mannose-containing spent liquor, which is preferably obtained from acid sulphite pulping. The spent liquor may be obtained directly from sulphite pulping. It may also be a concentrated sulphite pulping liquor or a side-relief obtained from sulphite cooking. It may also be a mannose-containing fraction chromatographically obtained from a sulphite pulping liquor.

In the present invention, the liquor to be treated may also be any other liquor obtained from the digestion or hydrolysis of biomass, typically a hydrolysate obtained from acid hydrolysis of lignocellulosic material. Such a hydrolysate may be obtained from lignocellulosic material for example by treatment with an inorganic acid, such as hydrochloric acid, sulphuric acid or sulphur dioxide, or by treatment with an organic acid, such as formic acid or acetic acid. A spent liquor obtained from solvent-based pulping, such as phenol-based pulping and ethanol-based pulping may also be used.

The starting solution containing mannose may be e.g. a spent sulphite pulping liquor recovered after the separation of rhamnose. The starting solution may also be a spent sulphite pulping liquor recovered after the separation of xylose.

The mannose product obtained in accordance with the present invention typically comprises D-mannose.

The following examples illustrate the invention. The examples are not be construed to limit the claims in any manner.

In the following examples, the following definitions are used:

DS refers to the dry substance content measured by Karl Fischer titration, expressed as % by weight, unless otherwise indicated.

The contents (expressed in % on DS) of various components of the fractions obtained from the chromatographic and other separations have been measured using the HPLC method.

Example 1

Figure 7:
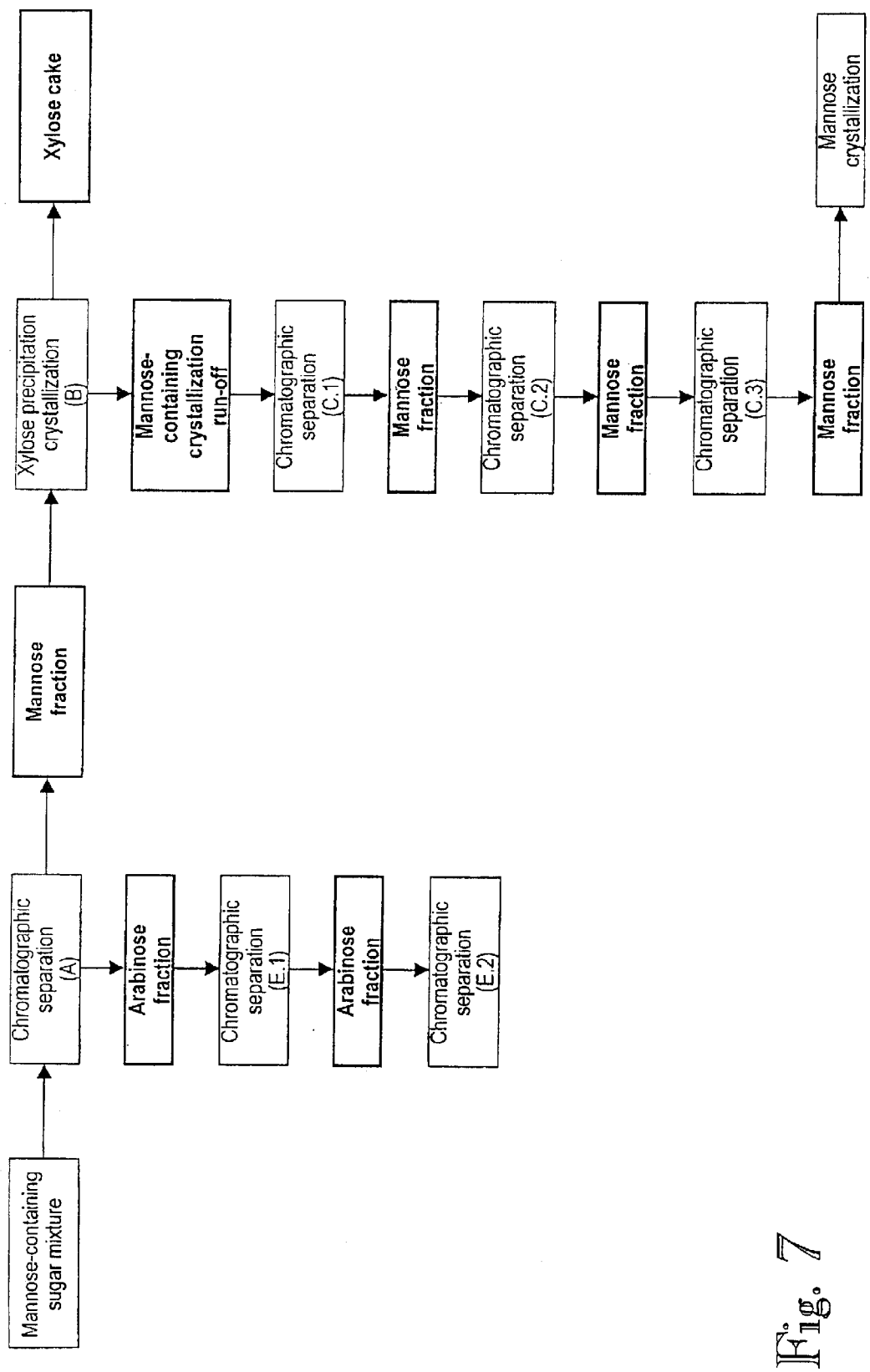
FIG. 7 is a process scheme describing one embodiment of the invention for recovering mannose and xylose. The process also includes separation of arabinose as a pretreatment step.

A process scheme describing the multistep separation process of Example 1 is presented in FIG. 7.

The starting liquor used in the first step of the process was a mannose-containing side stream separated from $Ca^{2+}$ based sulphite spent liquor after the recovery of xylose and rhamnose. Birch had been used as raw material for the sulphite pulping.

The mannose-containing side stream recovered after the separation of rhamnose was subjected to chromatographic separation to obtain a mannose fraction and an arabinose fraction (chromatographic separation A). The mannose fraction was subjected to separation B (xylose precipitation crystallization) to obtain a xylose cake and a crystallization run-off containing mannose. The mannose-containing run-off from the crystallization of xylose was subjected to three successive chromatographic separations (C.1), (C.2) and (C.3). The mannose fraction from the last chromatographic separation was subjected to mannose crystallization.

The arabinose fraction from separation (A) was subjected to two successive chromatographic separations (E.1) and (E.2) for recovering purified arabinose.

The starting mannose-containing liquor obtained after the separation of rhamnose had the following composition:

| Component | Content (% on DS) |
|---|---|
| Xylose | 36 |
| Mannose | 15 |
| Galactose | 13 |
| Glucose | 4.8 |
| Rhamnose | 0.6 |
| Arabinose | 4.9 |
| Fructose | 1.4 |
| Others | 24.6 |

(A) Separation of Arabinose Using $Na^+$-form SAC Resin

A strongly acid cation exchange resin in $Na^+$ form was used to remove the salts from the feed and to collect arabinose from the end of the elution profile. The separation was done using the following separation conditions:

| | |
|---|---|
| Column diameter | 0.6 m |
| Bed height | 5.3 m |
| Feed size | 108.5 l |
| Feed RSD | 35 g/100 g |
| Temperature | 65° C. |
| Flow rate | 170 l/h |
| Resin | Finex CS 11 GC, 5.5% DVB, average particle size 0.35 mm |

The composition of the mannose and arabinose fractions collected from separation (A) are set forth in Table 1.

TABLE 1

Composition of the mannose and arabinose fractions in % on DS

| Component | Mannose fraction | Arabinose fraction |
|---|---|---|
| Xylose | 43 | 34 |
| Mannose | 19 | 13 |
| Galactose | 16 | 10 |
| Glucose | 6.3 | 0.2 |
| Rhamnose | 1.1 | 0.1 |
| Arabinose | 1.8 | 17 |
| Fructose | 1.2 | 2.2 |
| Others | 8.9 | 23.5 |

The mannose yield was 38% for mannose purity of 19% on DS and xylose purity of 43% on DS.

The concentration profile of separation (A) is presented in FIG. 1.

(B) Xylose Precipitation Crystallization

The mannose fraction obtained from separation (A) and having a xylose content of about 43% on DS was subjected to precipitation crystallization to separate xylose.

The precipitation crystallization of xylose was carried out in pilot scale with one crystallizer of about 200 liters. The feed liquor was evaporated to a final DS of 87.5%. The batch was seeded in a boiling pan with xylose seed crystals. The mass was cooled down from 60° C. to 31° C. in 48 hours and then the mass was held at 31° C. for 24 hours. No dilutions were made. The mass was dropped down to a mingler and then filtrated.

The results of the xylose precipitation crystallization are set forth in Table 2. The table shows the contents of various components in the crystallization feed, cake and run-off in % on DS.

TABLE 2

Analysis results of the xylose precipitation crystallization

| Component | Feed | Cake | Run-off |
|---|---|---|---|
| Glucose | 5.9 | 2.9 | 7.0 |
| Xylose | 42.7 | 73.8 | 29.8 |
| Arabinose | 3.5 | 1.0 | 2.9 |
| Mannose | 19.5 | 7.2 | 23.7 |

The mannose purity of the crystallization run-off increased to about 24% on DS and the xylose purity decreased to about 30%.

(C) Mannose Separations (C.1.) Mannose Separation with $Ba^{2+}$ Form SAC Resin

The run-off fraction obtained from the xylose precipitation crystallization was subjected to chromatographic separation using a $Ba^{2+}$ form SAC resin. The separation was done using the following separation conditions:

| | |
|---|---|
| Column diameter | 0.225 m |
| Bed height | 5.3 m |
| Feed size | 11.9 l |
| Feed RSD | 32 g/100 g |
| Temperature | 65° C. |
| Flow rate | 25 l/h |
| Resin | Finex CS 08 GC, 4% DVB, average particle size 0.38 mm |

The mannose fraction was collected with a mannose yield of 70% and the total purity of 49% on DS was obtained. The composition of the mannose and xylose fractions is presented in Table 3.

TABLE 3

Composition of the mannose and xylose fractions from the first separation with $Ba^{2+}$ form SAC resin in % on DS

| Component | Xylose fraction | Mannose fraction |
|---|---|---|
| Xylose | 47 | 9.2 |
| Mannose | 9.6 | 49 |
| Galactose | 23 | 13 |
| Glucose | 12 | 0.2 |
| Rhamnose | 1.8 | 0.8 |
| Fructose | 0.1 | 4.0 |
| Others | 6.5 | 24.2 |

Figure 2:
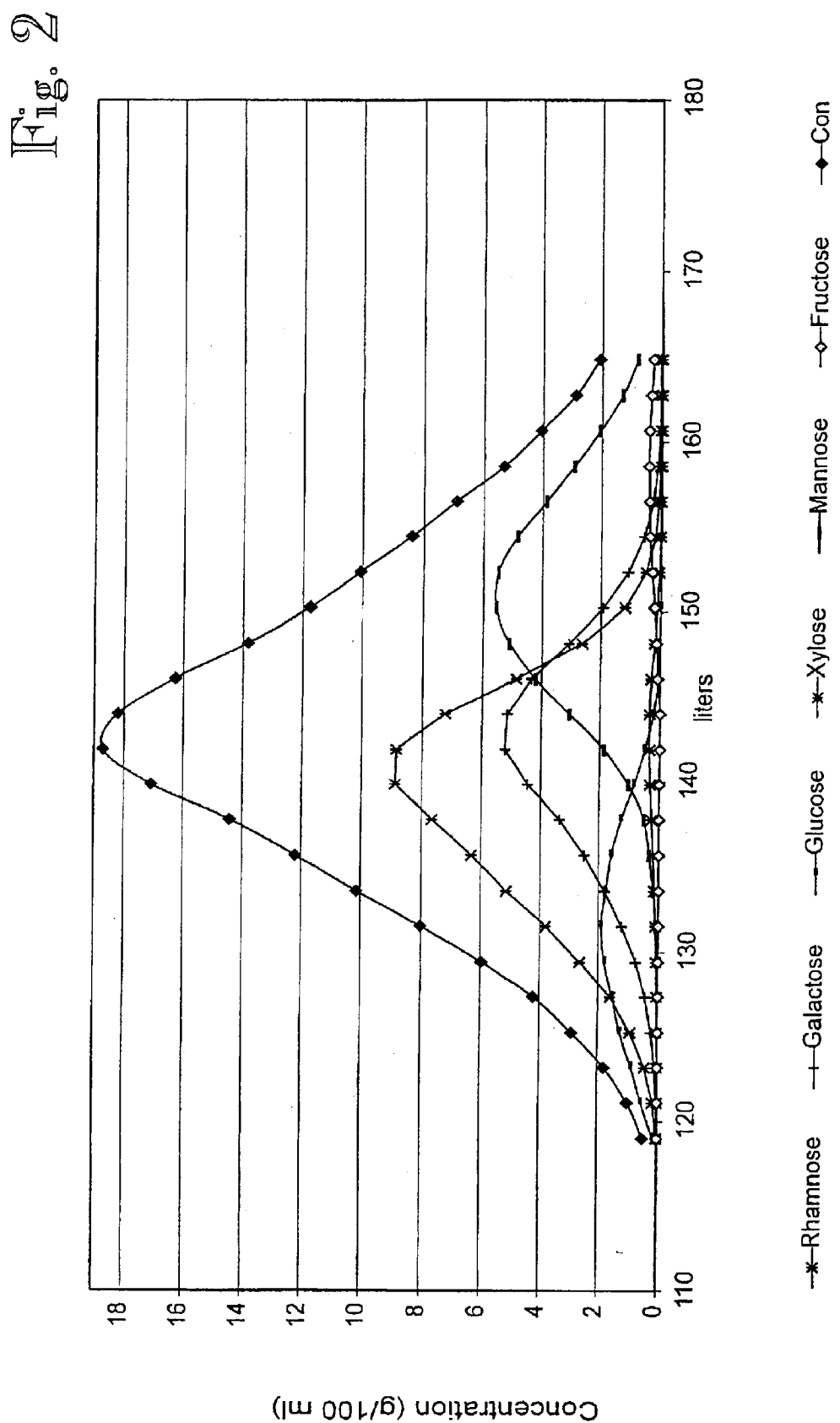
FIG. 2 is a graphical presentation of the concentration profile of the mannose separation with $Ba^{2+}$ form SAC resin (separation C.1) of Example 1.

The concentration profile of separation (C.1) is presented in FIG. 2.

(C.2.) $Ba^{2+}$ Form SAC Resin Separation

A second $Ba^{2+}$ form SAC resin separation was used to purify the mannose fraction obtained from the previous step (separation C.1). The same separation conditions were used as in separation (C.1) above.

The mannose fraction obtained from the separation had a purity of 63% on DS with a mannose yield of 68%. The compositions of the mannose and xylose fractions in % on DS are set forth in Table 4.

TABLE 4

Composition of the mannose and xylose fractions from the second separation with Ba$^{2+}$ form SAC resin

| Component | Xylose fraction | Mannose fraction |
|---|---|---|
| Xylose | 19 | 1.1 |
| Mannose | 41 | 63 |
| Galactose | 24 | 3.5 |
| Glucose | 0.5 | — |
| Rhamnose | 1.4 | 0.2 |
| Fructose | 0.7 | 7.8 |
| Others | 13.9 | 24.3 |

The xylose fraction still contained 40% mannose.

Figure 3:
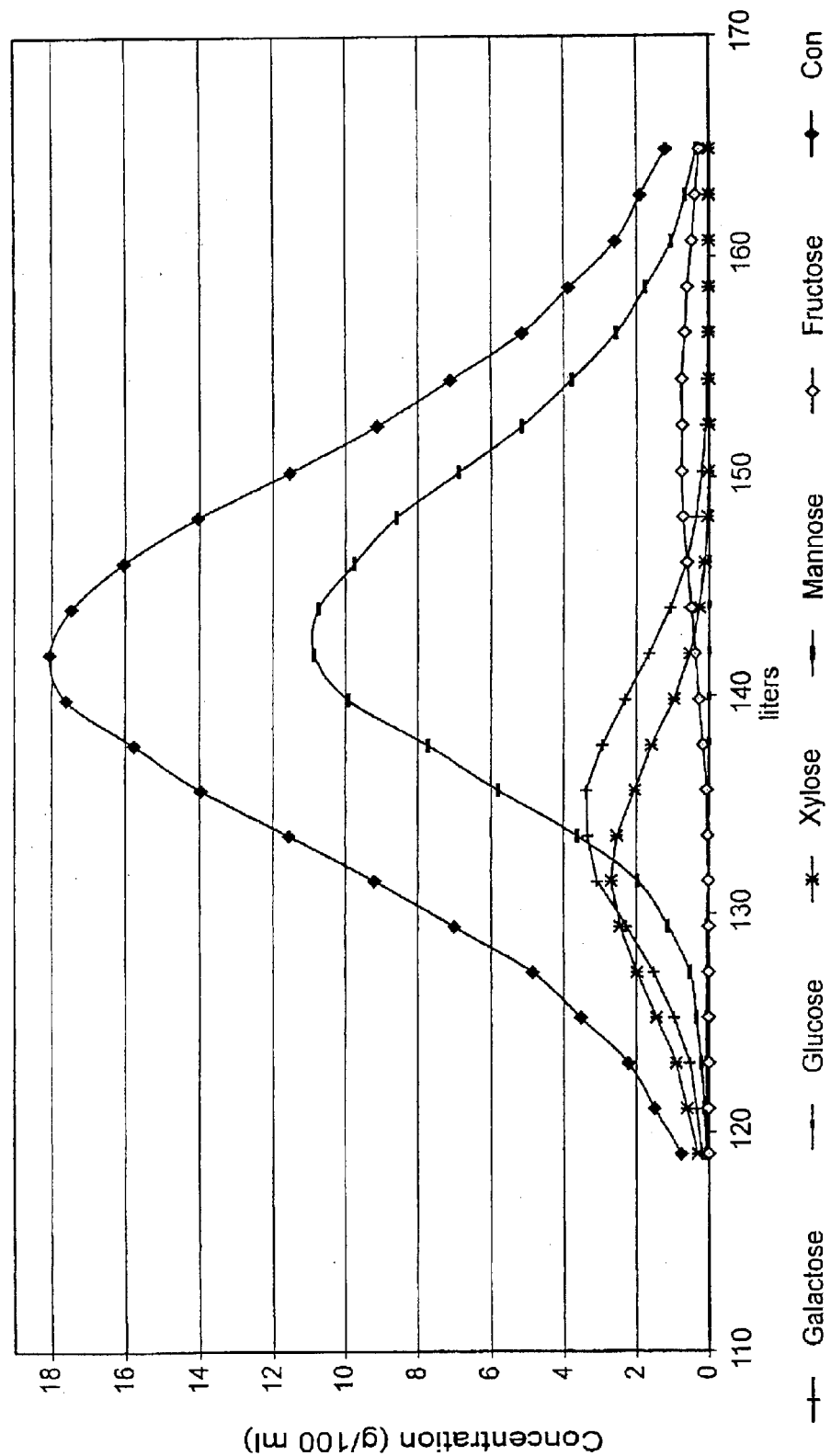
FIG. 3 is a graphical presentation of the concentration profile of the repeated mannose separation with $Ba^{2+}$ form SAC resin (separation C.2) of Example 1.

The concentration profile of separation (C.2) is presented in FIG. 3.

(C.3.) Separation with Ca$^{2+}$ Form SAC Resin

The mannose fraction obtained from separation (C.2) was subjected to a further chromatographic separation using Ca$^{2+}$ form SAC resin. The separation was done using the following separation conditions:

| | |
|---|---|
| Column diameter | 0.225 m |
| Bed height | 4.8 m |
| Feed size | 11 l |
| Feed RSD | 30.7 g/100 g |
| Temperature | 65° C. |
| Flow rate | 30 l/h |
| Resin | Finex CS 11 GC, 5.5% DVB, average particle size 0.35 mm |

The composition of the mannose fraction in % on DS is set forth in Table 5.

TABLE 5

Composition of the mannose fraction obtained from the separation with a Ca$^{2+}$ form SAC resin

| Component | Mannose fraction |
|---|---|
| Xylose | 1.8 |
| Mannose | 80 |
| Galactose | 5.1 |
| Glucose | — |
| Rhamnose | 0.2 |
| Fructose | 2.6 |
| Others | 10.3 |

Figure 4:
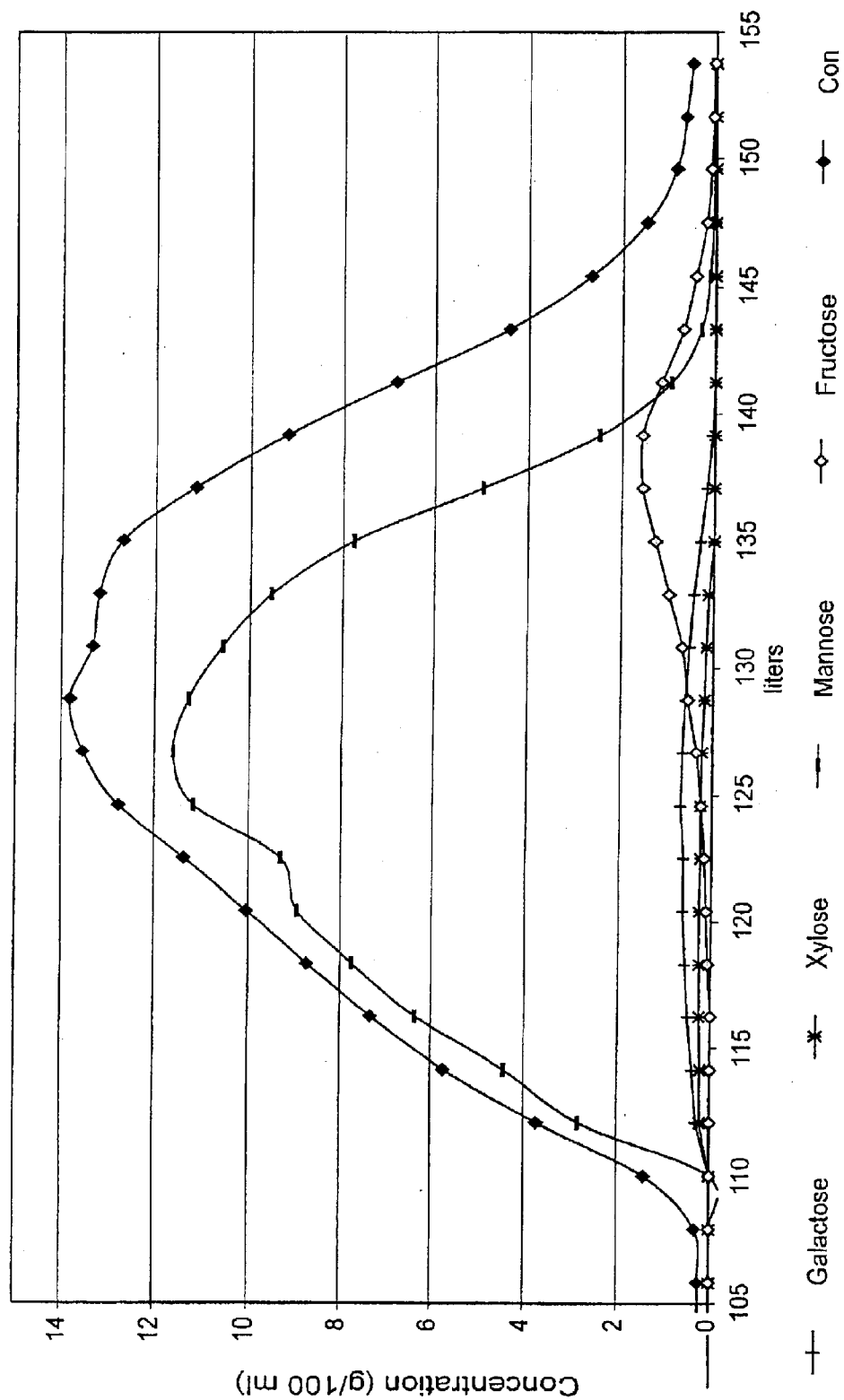
FIG. 4 is a graphical presentation of the concentration profile of the mannose separation with $Ca^{2+}$ form SAC resin (separation C.3) of Example 1.

Mannose fraction purity of 80% on DS was obtained with a mannose yield of 70%. The concentration profile of separation (C.3) is presented in FIG. 4.

D. Mannose Crystallization (D.1.) Mannose Crystallization Using Water-ethanol Solvent (Batch 1)

2924 g of mannose syrup having a DS of 51% and a mannose content of 78%, based on the refractometric dry solids content of pure mannose, was evaporated to RDS of 86.2% and moved to a 2-liter reaction vessel at a temperature of 30° C. Seeding (30° C., RDS 86.2%) was made to the boiling syrup with 0.03% seeds on DS. The seeds were suspended with 10 ml ethanol.

The mass was cooled down from a temperature of 30° C. to a temperature of 25° C. 800 g ethanol was added slowly to the mass.

After 5 days from seeding, the crystals were filtrated with a pressure filter. The filtration gave a cake purity of 93.0% (including solvent ethanol as impurity) and a mother liquor purity of 52.5% (including solvent ethanol as impurity). This corresponds to a mannose yield of 41%. The crystal size was in the range of 10 to 20 μm.

The filtration cake was washed twice with ethanol. The crystals were centrifuged and dried at 40° C. for 24 hours. The crystals had a crystal water content of 0.3% and a mannose content of 99.9%.

(D.2). Mannose Crystallization Using Water-ethanol Solvent (Batch 2)

1230 g of a mannose syrup having a DS of 50% and a mannose content of 93%, based on the refractometric dry solids content of pure mannose, was evaporated to an RDS of 84.1% and moved to a 2-liter reaction vessel at a temperature of 30° C. Seeding (30° C., RDS 84.1%) was made to the boiling syrup with 0.03% seeds on DS. The seeds were suspended with 10 ml ethanol.

The mass was cooled down from a temperature of 30° C. to a temperature of 20° C. 300 g ethanol was added slowly to the mass.

After 3 days from seeding, the crystals were centrifuged. The centrifuging gave a cake purity of 96.0% (including solvent ethanol as impurity). The centrifuging result corresponds to a 50% mannose yield. The crystal size was in the range of 30 to 50 μm.

The centrifuging cake was washed twice with ethanol. The crystals were centrifuged and dried at 40° C. for 24 hours. The crystal water content was analyzed to be 0.2%, and the crystal mannose content to be 99.7%.

(D.3.) Mannose Crystallization Using Water as the Solvent 1552 g of a mannose syrup having a DS of 50% and a mannose content of 80%, based on the refractometric dry solids content of pure mannose, was evaporated to an RDS of 86.7% and moved to a 1-liter reaction vessel at a temperature of 60° C. Seeding (60° C., RDS 86.7%) was made to the boiling syrup with 0.07% seeds on DS.

The mass was cooled down from a temperature of 60° C. to a temperature of 25° C. After 6 days from seeding, the centrifuging cake gave a purity of 99.5%. The centrifuging result corresponds to a mannose yield of 30%. The crystal size was in the range of 30 to 50 μm.

(E) Purification of the Arabinose Fraction

The arabinose fraction obtained from separation (A) had a purity of 10% on DS. This fraction was further purified with a Ca$^{2+}$ form SAC resin.

(E.1.) Purification of the Arabinose Fraction with a Ca$^{2+}$ Form SAC Resin.

The separation was done under the following separation conditions:

| | |
|---|---|
| Column diameter | 0.225 m |
| Bed height | 4.9 m |
| Feed size | 18.8 l |
| Feed RSD | 30.2 g/100 g |
| Temperature | 65° C. |
| Flow rate | 30 l/h |
| Resin | Finex CS 11 GC, 5.5% DVB, average particle size 0.40 mm |

The compositions of the feed, xylose and arabinose fractions in % on DS are set forth in Table 6.

TABLE 6

Composition of the feed, xylose and arabinose fractions from the first separation with Ca²⁺ resin

| Component | Feed | Xylose fraction | Arabinose fraction |
|---|---|---|---|
| Xylose | 39 | 50 | 21 |
| Mannose | 16 | 16 | 14 |
| Galactose | 13 | 15 | 9.2 |
| Glucose | 1.1 | 1.5 | 0.3 |
| Rhamnose | 0.3 | 0.3 | 0.3 |
| Arabinose | 9.7 | 3.5 | 19 |
| Fructose | 0.1 | 0.6 | 1.3 |
| Others | 20.8 | 13 | 35.4 |

Figure 5:
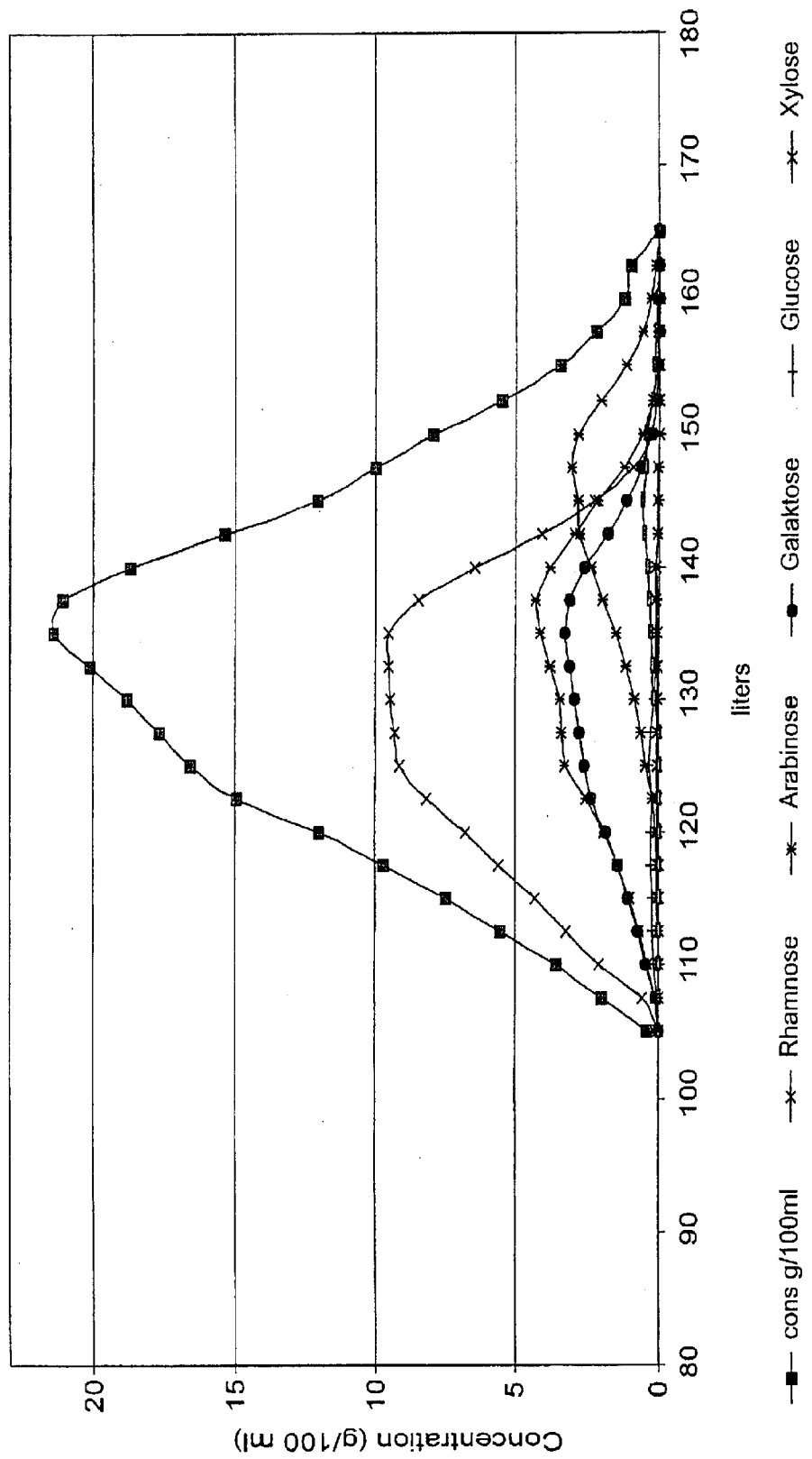
FIG. 5 is a graphical presentation of the concentration profile of the arabinose separation with $Ca^{2+}$ form SAC resin (separation E.1) of Example 1.

The concentration profile of separation (E.1) is presented in FIG. 5.

(E.2.) Repeated Purification of the Arabinose Fraction with a Ca²⁺ Form SAC Resin The arabinose fraction obtained from separation (E.1) was subjected to another purification with a Ca²⁺ form resin. The separation was done using the following separation conditions:

| | |
|---|---|
| Column diameter | 0.225 m |
| Bed height | 4.9 m |
| Feed size | 20 l |
| Feed RSD | 30.6 g/100 g |
| Temperature | 65° C. |
| Flow rate | 30 l/h |
| Resin | Finex CS 11 GC, 5.5% DVB, average particle size 0.40 mm |

The composition of the feed, xylose and arabinose fractions in % on DS is set forth in Table 7.

TABLE 7

Composition of the feed and xylose and arabinose fractions from the second separation with a Ca²⁺ form resin

| Component | Feed | Xylose fraction | Arabinose fraction |
|---|---|---|---|
| Xylose | 27 | 43 | 14 |
| Mannose | 16 | 20 | 13 |
| Galactose | 11 | 15 | 7 |
| Glucose | 0.2 | 0.6 | 0.0 |
| Rhamnose | 0.4 | 0.4 | 0.3 |
| Arabinose | 18 | 6.2 | 26 |
| Fructose | 3.8 | 1.5 | 5.3 |
| Others | 23.6 | 13.6 | 34.7 |

The arabinose was collected with an 85% yield.

Figure 6:
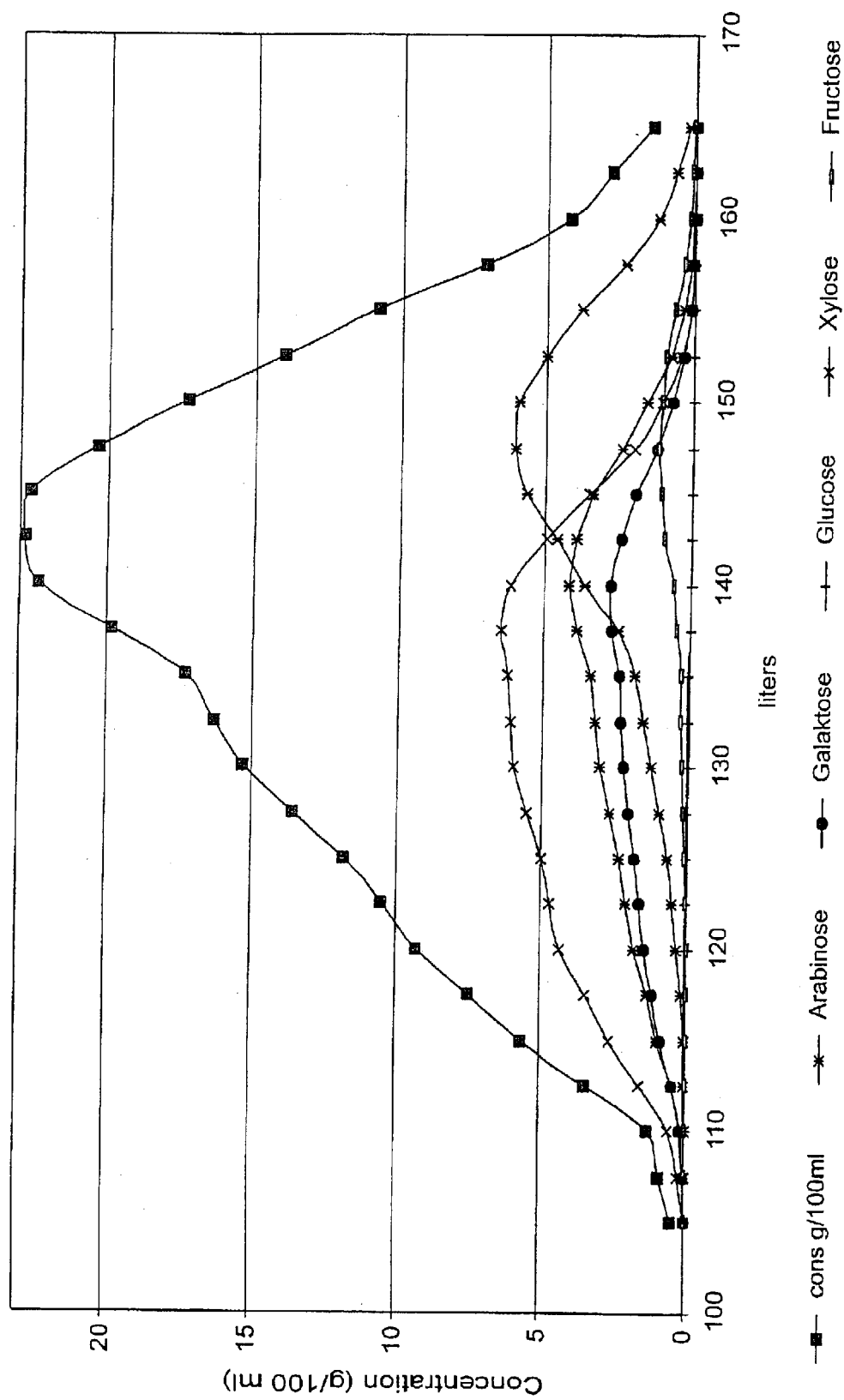
FIG. 6 is a graphical presentation of the concentration profile of the repeated arabinose separation with $Ca^{2+}$ form SAC resin (separation E.2) of Example 1.

The concentration profile of separation (E.2) is presented in FIG. 6.

It will be obvious to a person skilled in the art that, as the technology advances, the inventive concept can be implemented in various ways. The invention and its embodiments are not limited to the examples described above but may vary within the scope of the claims.

What is claimed is:

1. A method of recovering mannose from a solution derived from biomass, comprising subjecting said solution to a chromatographic separation process using at least one chromatographic separation resin bed which is at least partly in a Ba²⁺ form and at least one chromatographic separation resin bed which is in other than Ba²⁺ form and recovering at least one mannose fraction.

2. A method as claimed in claim 1, wherein said chromatographic separation process comprises at least two chromatographic separation steps, whereby at least one of these steps is carried out with a chromatographic separation resin bed which is at least partly in a Ba²⁺ form and at least one of these steps is carried out with a chromatographic separation resin bed which is in other than Ba²⁺ form.

3. A method as claimed in claim 2, comprising feeding a solution derived from biomass into a first chromatographic column including a chromatographic separation resin bed which is at least partly in a Ba²⁺ form, eluting said column with an eluant, recovering a first mannose fraction, and then feeding said first mannose fraction into a second chromatographic column including a chromatographic separation resin bed in other than Ba²⁺ form, eluting said column with an eluant, and recovering a second mannose fraction.

4. A method as claimed in claim 2, wherein said chromatographic separation process comprises two separation steps with a chromatographic separation resin bed which is at least partly in a Ba²⁺ form and one separation step with a chromatographic separation resin bed in other than Ba²⁺ form.

5. A method as claimed in claim 4, comprising feeding a solution derived from biomass into a first chromatographic column including a chromatographic separation resin bed which is at least partly in a Ba²⁺ form, eluting said column with an eluant, recovering a first mannose fraction, feeding said first mannose fraction into a second chromatographic column including a chromatographic separation resin bed which is at least partly in a Ba²⁺ form, eluting said column with an eluant, recovering a second mannose fraction, and then feeding said second mannose fraction into a third chromatographic column including a chromatographic separation resin bed in other than Ba²⁺ form, eluting said column with an eluant, and recovering a third mannose fraction.

6. A method as claimed in claim 1, wherein said resin which is at least partly in a Ba²⁺ form is substantially in Ba²⁺ form.

7. A method as claimed in claim 1, wherein said resin bed in other than Ba²⁺ form is in the form of a cation selected from hydrogen, $NH_4^+$, alkali metal cations and alkaline earth metal cations.

8. A method as claimed in claim 7, wherein said cation is selected from $NH_4^+$, $Na^+$, $K^+$, $Mg^{2+}$ and $Ca^{2+}$.

9. A method as claimed in claim 1, wherein said chromatographic separation process is carried out with a strongly acid cation exchange resin.

10. A method as claimed in claim 1, wherein the method further comprises one or more purification steps selected from membrane filtration, ion exchange, evaporation, filtration and derivatization carried out before, after or between said chromatographic separation step/steps.

11. A method as claimed in claim 10, wherein said derivatization comprises forming N-phenyl-D-mannopyranosylamine as a mannose derivative.

12. A method as claimed in claim 1, wherein the method further comprises crystallization of mannose to obtain a crystalline mannose product.

13. A method as claimed in claim 12, wherein said crystallization is carried out with a solvent selected from water, alcohol and a mixture of alcohol with water.

14. A method as claimed in claim 13, wherein said crystallization is carried out with a mixture of ethanol and water.

15. A method as claimed in claim 1, wherein the method further comprises separation of other sugars.

16. A method as claimed in claim 15, wherein the method comprises separation of xylose as a pre-treatment step.

17. A method as claimed in claim 16, wherein the separation of xylose is carried out through precipitation crystallization.

18. A method as claimed in claim 15, wherein the method further comprises separation of arabinose as a pretreatment step.

19. A method as claimed in claim 18, wherein the separation of arabinose is carried out before the precipitation crystallization of xylose.

20. A method as claimed in claim 19, wherein said separation of arabinose is carried out by a chromatographic separation process to recover an arabinose fraction.

21. A method as claimed in claim 20, wherein said chromatographic separation is carried out using a chromatographic separation resin bed in the form of a monovalent cation.

22. A method as claimed in claim 21, wherein said monovalent cation is selected from hydrogen, ammonium and alkali metal cations.

23. A method as claimed in claim 22, wherein said cation is selected from $H^+$, $NH_4^+$, $Na^+$ and $K^+$.

24. A method as claimed in claim 20, wherein the method further comprises chromatographic purification of said arabinose fraction.

25. A method as claimed in claim 24, wherein the chromatographic purification of said arabinose fraction comprises at least one step using a chromatographic separation resin bed in the form of an alkaline earth metal cation.

26. A method as claimed in claim 25, wherein said alkaline earth metal is $Ca^{2+}$.

27. A method as claimed in claim 20, wherein said separation of arabinose is carried out with a strongly acid cation exchange resin.

28. A method as claimed in claim 15, wherein the method further comprises separation of rhamnose as a pretreatment step.

29. A method as claimed in claim 28, wherein the separation of rhamnose is carried out before the separation of arabinose.

30. A method as claimed in claim 1, wherein said solution derived from biomass is a mixture containing carbohydrates.

31. A method as claimed in claim 30, wherein said carbohydrates comprise sugars.

32. A method as claimed in claim 1, wherein said solution derived from biomass is a biomass hydrolysate.

33. A method as claimed in claim 1, wherein said solution derived from biomass is a spent sulphite pulping liquor.

34. A method as claimed in claim 33, wherein said spent sulphite pulping liquor is a spent sulphite pulping liquor recovered after the separation of rhamnose.

35. A method as claimed in claim 33, wherein said spent sulphite pulping liquor is a spent sulphite pulping liquor recovered after the separation of xylose.

36. A method as claimed in claim 1, wherein said mannose is D-mannose.

* * * * *